United States Patent
Motoyama

(10) Patent No.: US 8,925,673 B2
(45) Date of Patent: Jan. 6, 2015

(54) TRANSMISSION RATIO VARIABLE DEVICE

(71) Applicant: JTEKT Corporation, Osaka-shi, Osaka (JP)

(72) Inventor: Satoshi Motoyama, Knoxville, TN (US)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 14/100,375

(22) Filed: Dec. 9, 2013

(65) Prior Publication Data

US 2014/0165753 A1 Jun. 19, 2014

(30) Foreign Application Priority Data

Dec. 19, 2012 (JP) ................................. 2012-276998

(51) Int. Cl.
 *B62D 5/04* (2006.01)
 *F16H 1/32* (2006.01)
 *B62D 5/00* (2006.01)

(52) U.S. Cl.
 CPC ................ *F16H 1/321* (2013.01); *B62D 5/008* (2013.01)
 USPC ........................................................ 180/444

(58) Field of Classification Search
 CPC ............................... B62D 5/008; F16H 1/321
 USPC ................................................. 180/443, 444
 See application file for complete search history.

(56) References Cited

U.S. PATENT DOCUMENTS

| 7,824,271 | B2 * | 11/2010 | Von Gaisberg-Helfenberg ... 464/160 |
| 8,371,977 | B2 * | 2/2013 | Shiina et al. .................... 475/18 |
| 2008/0149412 | A1 * | 6/2008 | Osanai et al. ................. 180/443 |
| 2009/0120391 | A1 | 5/2009 | Schäfer et al. |
| 2011/0108355 | A1 | 5/2011 | Shiina et al. |

FOREIGN PATENT DOCUMENTS

| EP | 2 298 624 A1 | 3/2011 |
| GB | 2 216 982 A | 10/1989 |
| SU | 1753101 A1 | 8/1992 |

OTHER PUBLICATIONS

Apr. 7, 2014 Extended European Search Report issued in European Patent Application No. 13196754.9.

* cited by examiner

*Primary Examiner* — Kevin Hurley
(74) *Attorney, Agent, or Firm* — Oliff PLC

(57) ABSTRACT

A preload adjusting plug is inserted through a communication hole extending through center portions of a Z1 gear, a Z4 gear, and an inner ring of a nutation gear. A male thread portion is formed at an outer periphery of one end of the preload adjusting plug, and is screwed to a female thread portion formed at an inner periphery of the Z1 gear. A disc-shaped flange portion extending radially outward is formed at the other end of the preload adjusting plug, and axially presses a back face of the Z4 gear through a bearing. The preload adjusting plug applies predetermined preloads to meshing portions in the nutation gear mechanism.

4 Claims, 3 Drawing Sheets

TRANSMISSION RATIO VARIABLE DEVICE

INCORPORATION BY REFERENCE

This application claims priority to Japanese Patent Application No. 2012-276998 filed on Dec. 19, 2012 the disclosure of which, including the specification, drawings and abstract, is incorporated therein by reference in its entirety.

BACKGROUND OF THE INVENTION

1. Field of the Invention

The invention relates to a transmission ratio variable device.

2. Description of Related Art

There has been known a technology in which a nutation gear mechanism is used as a transmission mechanism, and there has been proposed a transmission ratio variable device that adds rotation based on motor drive to rotation of an input shaft based on a steering operation, by using a differential mechanism, and transmits the resultant rotation to an output shaft so as to change a rotation transmission ratio (steering gear ratio) between the input shaft and the output shaft (refer to, for example, US2011/0108355 A1).

The transmission mechanism in the transmission ratio variable device includes the nutation gear mechanism that serves as the differential mechanism. The nutation gear mechanism includes a first gear rotated together with the input shaft, a fourth gear rotated together with the output shaft, and a nutation gear that includes a second gear meshed with the first gear and a third gear meshed with the fourth gear, and that is rotated around an axis inclined to the axes of the first gear and the fourth gear. The nutation gear is rotated according to differences in the number of teeth between the first gear and the second gear that are meshed with each other, and between the third gear and the fourth gear that are meshed with each other while oscillating in a direction of the axis of the input shaft through a bearing. The nutation gear changes the speed of the rotation input from the input shaft, and transmits the rotation, whose speed has been changed, to the output shaft, and the nutation gear is rotated by driving means to change the rotation transmission ratio between the input shaft and the output shaft.

In the transmission ratio variable device as described above, gears may not be normally meshed with each other in the nutation gear mechanism, and accordingly abnormal noise may be caused. Thus, in order to allow meshing at a stable position so as to suppress abnormal noise, a configuration, in which meshing portions in the nutation gear mechanism are supported from axially opposite sides by the first gear and the fourth gear so as to apply preloads toward the nutation gear side, is used. For example, by using a method in which preload plugs are fastened and secured from opposite sides of the first gear and the fourth gear, preloads are respectively applied to the meshing portions in the nutation gear mechanism, and thus, an appropriate meshing state is maintained. However, since it is necessary to respectively apply the preloads to the first gear and the fourth gear, the manufacturing man-hours are increased, and the performance may vary due to occurrence of variation in the preloads on the opposite sides. Further, since the nutation gear is provided between the first gear and the fourth gear, if the thrust rigidity of the nutation gear mechanism is low, the nutation gear may bend to a large extent, and accordingly, the gears may not be normally meshed with each other, and as a result, vibration or breakage may occur in the nutation gear mechanism.

SUMMARY OF THE INVENTION

The invention provides a transmission ratio variable device that makes it possible to reduce variation in preloads applied from opposite sides of a nutation gear mechanism, with the use of a simple configuration.

According to a feature of an example of the invention, there is provided a transmission ratio variable device including: an input shaft coupled to a steering wheel; a housing that supports the input shaft so that the input shaft is rotatable relative to the housing; an electric motor having a motor output shaft provided so as to be rotatable relative to the housing; a speed reducer that is coupled to the motor output shaft, and outputs a steered angle that is obtained by reducing a motor rotation angle; an output shaft that transmits the steered angle output from the speed reducer, to steered wheels; and a preload applying mechanism that applies axial preloads to gear meshing portions in the speed reducer, wherein the speed reducer includes: a first gear that is provided on the input shaft so as to be rotatable together with the input shaft, and includes first teeth formed at an end face of the first gear; a fourth gear that is provided on the output shaft so as to be rotatable together with the output shaft, and includes fourth teeth formed at an end face of the fourth gear, the end face of the fourth gear facing the end face of the first gear; an inclined shaft provided so as to be inclined with respect to the input shaft and the output shaft; and a nutation gear that is provided so as to be inclined with respect to the motor output shaft, and is supported by the inclined shaft so as to be rotatable, the nutation gear including a second gear and a third gear that have second and third teeth, respectively, the second and third teeth being formed at different end faces of the nutation gear so as to mesh with the first and fourth gears, respectively, and the nutation gear rotating according to a difference in the number of teeth between the first gear and the second gear, or a difference in the number of teeth between the fourth gear and the third gear while oscillating in an axial direction of the input shaft, between the first and fourth gears due to rotation of the inclined shaft, and wherein the preload applying mechanism includes a preload adjusting plug that is axially inserted through a communication hole extending through center portions of the first gear, the nutation gear and the fourth gear, one end portion of the preload adjusting plug is screwed to an inner peripheral surface of the first gear so that the preload adjusting plug is axially movable, a flange portion is provided at the other end portion of the preload adjusting plug so as to extend radially outward, and the flange portion is engaged with a back face of the fourth gear.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
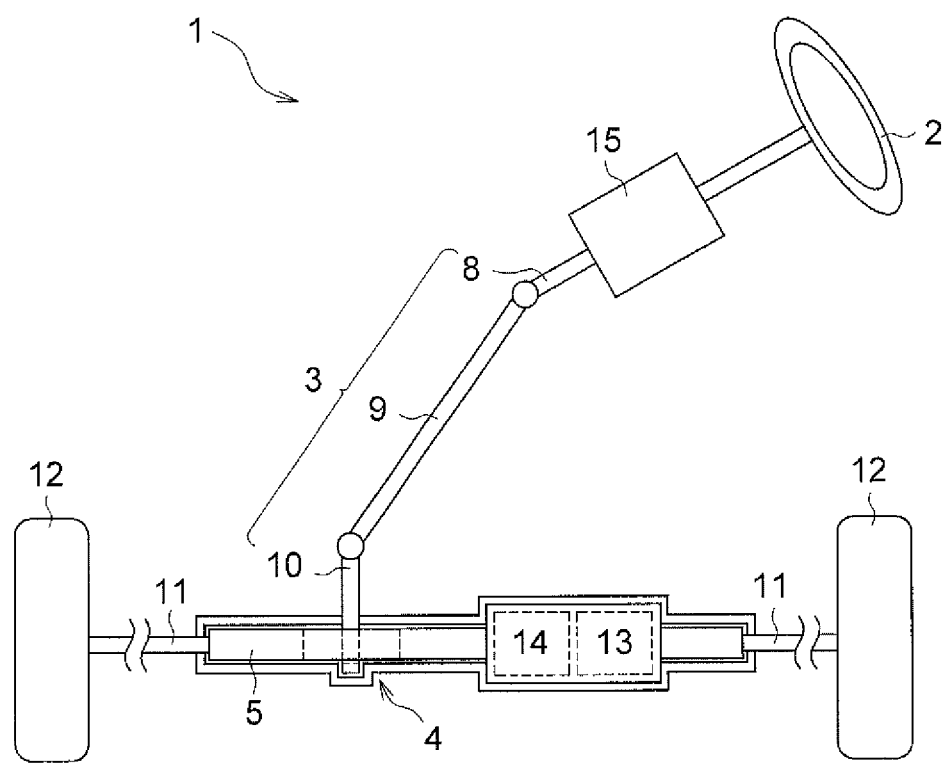
FIG. 1 shows a schematic configuration of a vehicle steering system that includes a transmission ratio variable device according to an embodiment of the present invention.

A transmission ratio variable device that is installed in a vehicle according to an embodiment of the present invention will be described with reference to the accompanying drawings. FIG. 1 shows a schematic configuration of a vehicle steering system 1 that includes a transmission ratio variable device 15 according to the embodiment of the present invention. As shown in FIG. 1, in the vehicle steering system 1, a steering shaft 3 to which a steering wheel 2 is secured is coupled to a rack shaft 5 through a rack and pinion mechanism 4. Thus, the rotation of the steering shaft 3 caused by a steering operation is converted to a reciprocating linear motion of the rack shaft 5 by the rack and pinion mechanism 4. The steering shaft 3 is constituted by a column shaft 8, an intermediate shaft 9 and a pinion shaft 10 that are coupled to each other.

Further, the reciprocating linear motion of the rack shaft 5 due to the rotation of the steering shaft 3 is transmitted to knuckles (not shown) through tie rods 11 coupled to opposite ends of the rack shaft 5, and thus, the steered angle of steered wheels 12, that is, the traveling direction of the vehicle is changed. The vehicle steering system 1 in this embodiment is configured as a so-called rack assist type electric power steering system (ESP) in which rotation of an assist motor 13 is converted to the reciprocating linear motion of the rack shaft 5 by a ball screw mechanism 14, and this reciprocating linear motion is transmitted so that the motor torque is applied to the steering system, as an assist force.

Further, in the vehicle steering system 1, the transmission ratio variable device 15 is provided in an intermediate portion of the column shaft 8. The transmission ratio variable device 15 changes the ratio of the steered angle (tire angle) of the steered wheels 12 with respect to the steering angle of the steering wheel 2, that is, the transmission ratio (steering gear ratio). This transmission ratio variable device 15 is provided to change the rotation transmission ratio between an input shaft and an output shaft of the column shaft 8 of the steering shaft 3, and includes a nutation gear mechanism.

Figure 2:
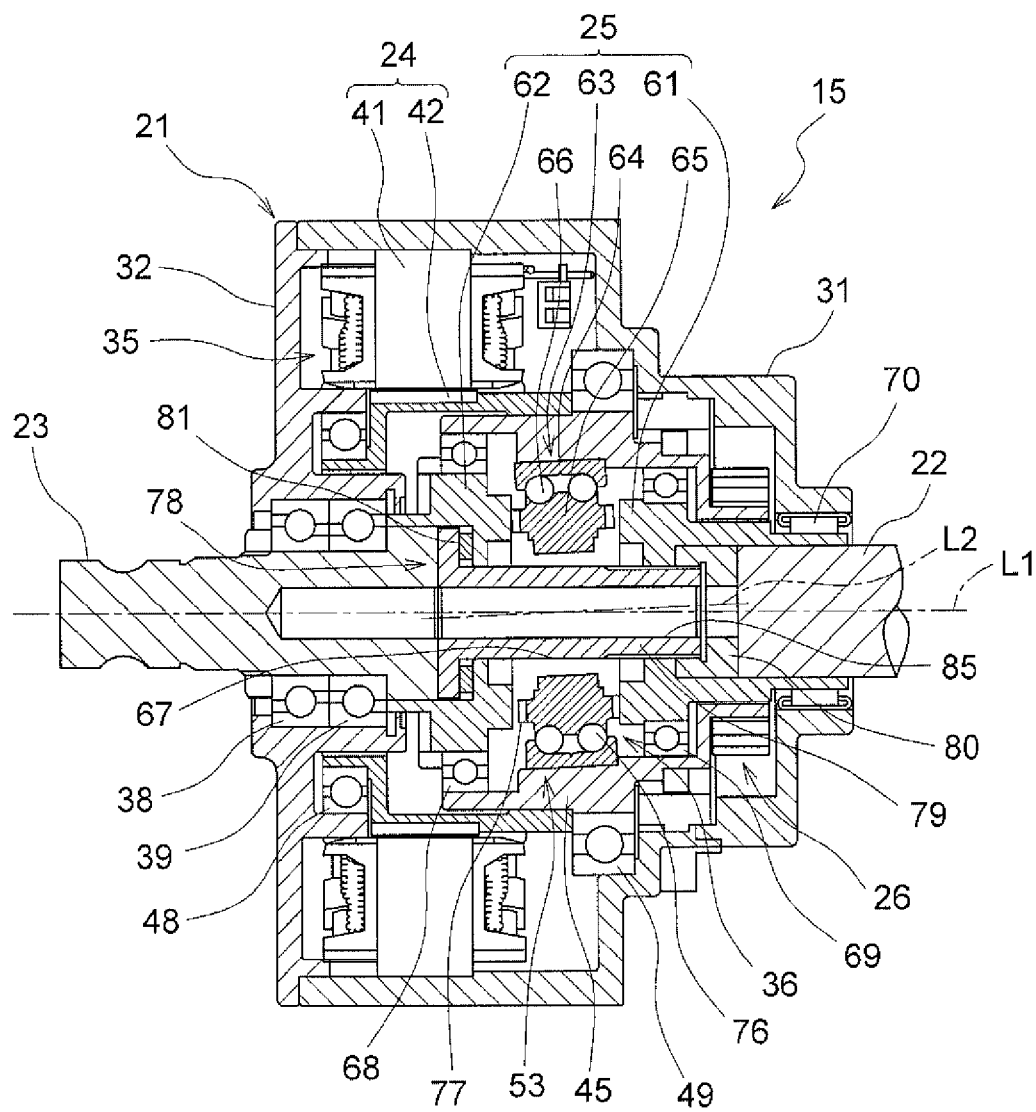
FIG. 2 is a longitudinal sectional view showing the transmission ratio variable device according to the embodiment of the present invention.

FIG. 2 is a longitudinal sectional view showing the transmission ratio variable device 15 according to the embodiment of the present invention. As shown in FIG. 2, the transmission ratio variable device 15 includes a substantially cylindrical housing 21 secured to a vehicle body (not shown), a first shaft (hereinafter referred to as "input shaft") 22 that serves as an input shaft through which the rotation due to the steering operation is input, and a second shaft (hereinafter referred to as "output shaft") 23 that serves as an output shaft coupled to the intermediate shaft 9 (refer to FIG. 1). The input shaft 22 and the output shaft 23 are supported by the housing 21 through bearings 38, 39, 70 so that the input shaft 22 and the output shaft 23 are rotatable relative to the housing 21. The input shaft 22 and the output shaft 23 constitute the column shaft 8 (refer to FIG. 1). In other words, the housing 21 is not rotated by the rotation of the input shaft 22.

The transmission ratio variable device 15 includes an electric motor 24 and the nutation gear mechanism 25 serving as a differential mechanism. The electric motor 24 and the nutation gear mechanism 25 are accommodated in the housing 21. The transmission ratio variable device 15 adds a rotation based on motor drive to the rotation of the input shaft 22 by using the nutation gear mechanism 25, and transmits a resultant rotation to the output shaft 23. Further, the transmission ratio variable device 15 includes a lock mechanism 26 that locks (restrains) the rotation of the electric motor 24 as necessary so as to mechanically fix the transmission ratio.

The housing 21 is formed of a metal material (such as aluminum alloy) and includes a cylindrical housing body 31 in which the electric motor 24 and the nutation gear mechanism 25 are accommodated, and an annular lower cover 32 that covers one axial end side (the left side, that is, an arrow a2-side in FIG. 2) of the housing body 31. The housing body 31 includes a motor accommodation portion 35 in which the electric motor 24 is accommodated and which is defined radially outward, and a gear accommodation space 36 in which the nutation gear mechanism 25 is accommodated and which is defined radially inward.

The lock mechanism 26 that locks a motor rotary shaft (motor output shaft) 45 is accommodated in the housing body 31 on the other axial end side (the right side, that is, an arrow a1-side in FIG. 2). The input shaft 22 is rotatably supported by the bearing 70 provided in the housing body 31, and the output shaft 23 is rotatably supported by the bearings 38, 39 provided in the lower cover 32. The input shaft 22 and the output shaft 23 are disposed on the same axis (a central axis L1).

The electric motor 24 is configured as a brushless motor including a stator 41 secured in the motor accommodation portion 35 and a rotor 42 rotatably provided inside the stator 41. The motor rotary shaft 45 is hollow, and the input shaft 22 is coaxially inserted in the motor rotary shaft 45. The motor rotary shaft 45 has an axial length that is set to be longer than that of the motor accommodation portion 35, a shaft end portion of the motor rotary shaft 45 on the arrow a1-side being located in the housing body 31, and a shaft end portion of the motor rotary shaft 45 on the arrow a2-side being located in the gear accommodation space 36. The motor rotary shaft 45 is rotatably supported by a bearing 48 provided in the lower cover 32 and a bearing 49 provided in the housing body 31. Further, a rotation angle sensor (not shown, such as a resolver) that detects a rotation angle of the rotor 42 is accommodated in the motor accommodation portion 35 of the housing body 31.

In this embodiment, since the nutation gear mechanism 25 is accommodated inside the rotor 42, the axial length of the housing 21 can be shortened, and as a result, it is possible to ensure a long impact absorbing stroke for the vehicle, or it is possible to ensure a fitting space for other devices (for example, a tilt-telescopic mechanism) that are to be fitted adjacent to the housing 21.

As shown in FIG. 2, an inclined shaft portion 53 is coupled to the radial inside of the motor rotary shaft 45 so as to be rotatable together with the motor rotary shaft 45. The inclined shaft portion 53 has a central axis L2 that is inclined with respect to the central axis L1 of the motor rotary shaft 45 (the central axes of the input shaft 22 and the output shaft 23). The inclined shaft portion 53 has an outer peripheral surface that defines a cylinder inclined with respect to the central axis L1.

The nutation gear mechanism 25 includes a Z1 gear (first gear) 61 that is coupled to the input shaft 22 so as to be rotatable together with the input shaft 22, a Z4 gear (fourth gear) 62 that is coupled to the output shaft 23 so as to be rotatable together with the output shaft 23, and a nutation gear 63 that is located between the Z1 gear 61 and the Z4 gear 62 and coupled to the motor rotary shaft 45 through the inclined shaft portion 53.

The Z1 gear 61 formed in a cylindrical shape. A plurality of first teeth projecting toward the arrow a2-side are arranged in the circumferential direction at an outer peripheral edge of the Z1 gear 61. In this embodiment, each of the first teeth is constituted by a columnar roller that is radially arranged with respect to the Z1 gear 61 and that is disposed so as to be rotatable around its axis. Further, the shaft end portion of the input shaft 22 is serration-fitted in an inner peripheral surface of the Z1 gear 61, and thus, the Z1 gear 61 is coupled to the input shaft 22 so as to be coaxially rotatable together with the input shaft 22. That is, the central axis of the Z1 gear 61 is coincident with the central axis L1 of the motor rotary shaft 45.

The Z4 gear 62 formed in a disc shape. In the Z4 gear 64, a plurality of fourth teeth projecting toward the arrow a1-side are arranged in the circumferential direction. In this embodiment, as in the Z1 gear 61, each of the fourth teeth is constituted by a columnar roller that is radially arranged with respect to the Z4 gear 62 and that is disposed so as to be rotatable around its axis. The Z4 gear 62 is fixed at inner periphery of the motor rotary shaft 45 formed in a cylindrical shape, and is coupled to an outer peripheral surface of the output shaft 23 through serration fitting. That is, the Z4 gear 62 is coupled to the output shaft 23 so as to be coaxially rotatable together with the output shaft 23, and the central axis of the Z4 gear 62 is coincident with the central axis L1 of the motor rotary shaft 45. A bearing 68 is interposed between the inclined shaft portion 53 and the Z4 gear 62, and a bearing 69 is interposed between the inclined shaft portion 53 and the Z1 gear 61.

The nutation gear 63 includes a cylindrical outer ring 64, a cylindrical inner ring gear 65 and rolling elements (balls) 66 interposed between the outer ring 64 and the inner ring gear 65. Second teeth that can be meshed with the first teeth are arranged in the circumferential direction at an end face of the inner ring gear 65 on the arrow a1-side (Z1 gear-side). Meanwhile, third teeth that can be meshed with the fourth teeth are arranged in the circumferential direction at an end face of the inner ring gear 65 on the arrow a2-side (Z4 gear 62-side). That is, the inner ring gear 65 constitutes a Z2 gear (second gear) 76 and a Z3 gear (third gear) 77. In this embodiment, the number N1 of the first teeth is set to be smaller than the number N2 of the second teeth by one, and the number N3 of the third teeth is set to be equal to the number N4 of the fourth teeth. For example, in the case where the number N1 of the first teeth is 19, the number N2 of the second teeth is 20, the number N3 of the third teeth is 20, and the number N4 of the fourth teeth is 20, the speed reduction ratio between the motor rotary shaft 45 and the output shaft 23 at this stage is set to 20.

The outer ring 64 is coupled to an outer periphery of the inclined shaft portion 53 so as to be rotatable together with the motor rotary shaft 45. That is, the central axis of the nutation gear 63 is coincident with the central axis L2 of the inclined shaft portion 53, and accordingly, the nutation gear 63 is rotated around the axis that is inclined with respect to the axes of the Z1 gear 61 and the Z4 gear 62. In the inner ring gear 65, only a portion of the Z2 gear 76 is meshed with the Z1 gear 61 while only a portion of the Z3 gear 77 is meshed with the Z4 gear 62. A meshing portion between the Z1 gear 61 and the Z2 gear 76 is angularly separated from a meshing portion between the Z4 gear 62 and the Z3 gear 77 by approximately 180 degrees around the central axes of the Z1 gear 61 and the Z4 gear 62.

A preload applying mechanism 78 applies axial preloads to the nutation gear mechanism 25 so that the Z1 gear 61 and the Z4 gear 62 approach each other. The preload applying mechanism 78 has a configuration in which a preload adjusting plug 79 screwed to an inner peripheral surface of the Z1 gear 61 coupled to the input shaft 22 is fastened from the outside, and is rotated and moved so as to axially urge the Z1 gear 61 and the Z4 gear 62. Thus, the preload applying mechanism 78 is configured to be able to adjust and maintain the axial preloads applied to the nutation gear mechanism 25.

Thus, in the nutation gear mechanism 25 to which each of the input shaft 22, the output shaft 23 and the motor rotary shaft 45 is coupled, the rotation of the input shaft 22 is transmitted from the Z1 gear 61, through the nutation gear 63 and the Z4 gear 62, to the output shaft 23. When the electric motor 24 is driven, and thus the motor rotary shaft 45 is rotated, the inclined shaft portion 53 coupled to the motor rotary shaft 45 nutates. Thus, the inner ring gear 65 also nutates together with the outer ring 64 secured to the inclined shaft portion 53, and as a result, the meshing portion (gear meshing portion) between the Z1 gear 61 and the Z2 gear 76 and the meshing portion (gear meshing portion) between the Z4 gear 62 and the Z3 gear 77 are rotated in the same direction.

As a result, a difference in rotation based on a difference in the number of teeth between the Z1 gear 61 and the Z2 gear 76 and a difference in the number of teeth between the Z4 gear 62 and the Z3 gear 77, that is, the rotation based on the motor drive is added to the rotation of the input shaft 22, and the resultant rotation is transmitted to the output shaft 23 (for example, in the case where the speed reduction ratio is 20, one rotation is added to the rotation of the output shaft 23 when the motor rotary shaft 45 makes 20 rotations). Thus, the rotation transmission ratio between the input shaft 22 and the output shaft 23, that is, the transmission ratio (steering gear ratio) between the steering wheel 2 (refer to FIG. 1) and the steered wheels 12 (refer to FIG. 1) is changed in accordance with the rotation based on the motor drive.

Figure 3:
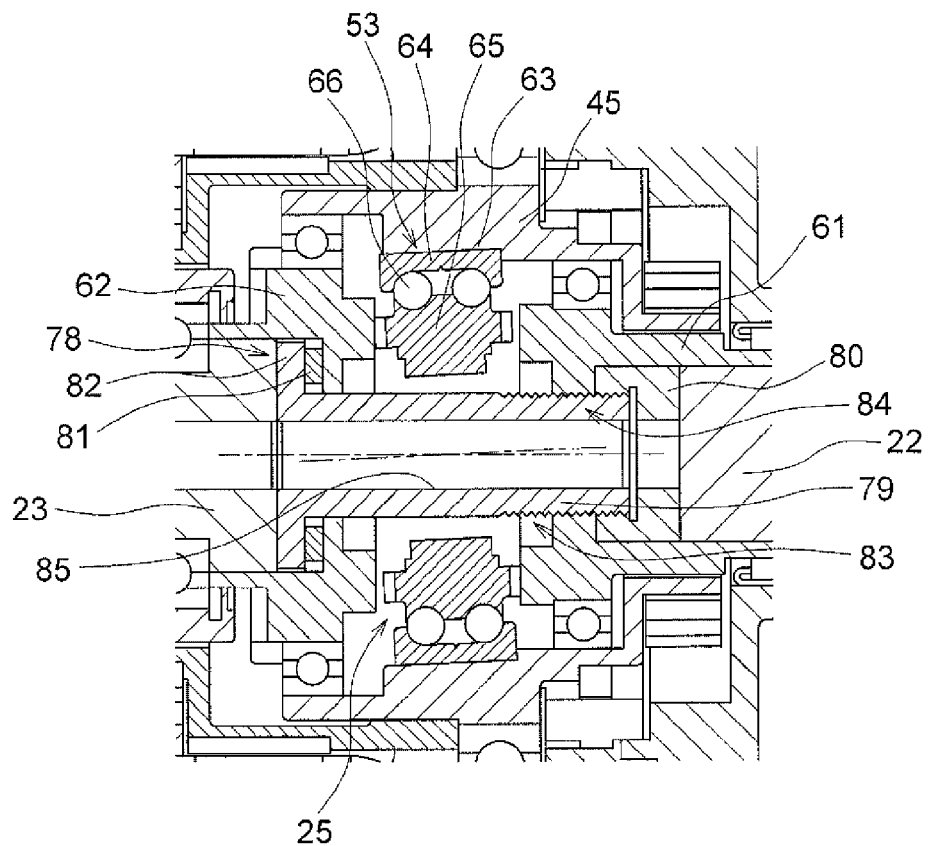
FIG. 3 is an enlarged sectional view showing a preload applying mechanism shown in FIG. 2.
Figure 4:
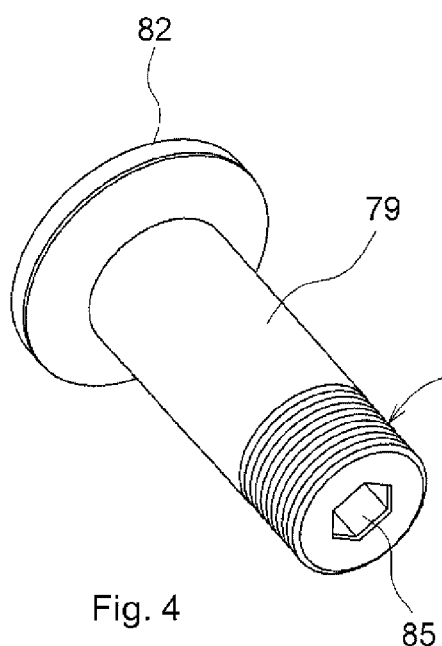
FIG. 4 is a perspective view showing a preload adjusting plug.
Figure 5:
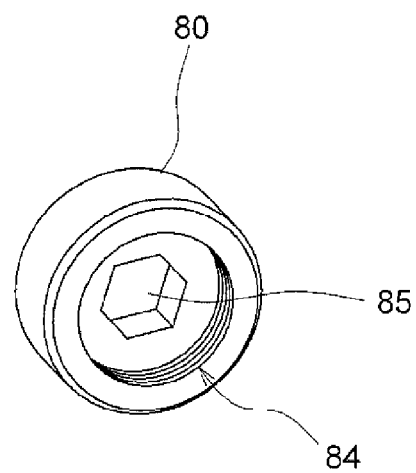
FIG. 5 is a perspective view showing a locking nut.

Next, FIG. 3 is an enlarged sectional view showing the preload applying mechanism 78 shown in FIG. 2, FIG. 4 is a perspective view showing the preload adjusting plug 79, and FIG. 5 is a perspective view showing a lock nut (looking nut) 80. As shown in FIG. 3, each of the Z1 gear 61, the Z4 gear 62 and the inner ring gear 65 of the nutation gear 63 in the transmission ratio variable device 15 (refer to FIG. 2) is annular, On end of the input shaft 22 is inserted through an inner periphery of the Z1 gear 61 and is coupled to the Z1 gear 61 so as to be rotatable together with the Z1 gear 61. The output shaft 23 is inserted through an inner periphery of the Z4 gear 62 and is coupled to the Z4 gear 62 so as to be rotatable together with the Z4 gear 62.

The preload applying mechanism 78 is constituted by the preload adjusting plug 79, a bearing 81 and the lock nut 80. The preload adjusting plug 79 that is cylindrical is inserted through a communication hole 67 that axially extends through center portions of the Z1 gear 61, the Z4 gear 62 and the inner ring gear 65 of the nutation gear 63. A male thread portion 83 is formed at an outer periphery of one end of the preload adjusting plug 79, and is screwed to a female thread portion 84 formed at the inner periphery of the Z1 gear 61. A disc-shaped flange portion 82 extending radially outward is formed at the other end of the preload adjusting plug 79, and axially presses a back face of the Z4 gear 62 through the bearing 81. The lock nut 80, which is annular and in which the female thread portion 84 is formed at its inner periphery, is screwed to the end portion of the male thread portion 83 of the preload adjusting plug 79, to which the Z1 gear 61 is screwed, and thus, the preload adjusting plug 79 is restricted from being loosened. Thus, the preload adjusting plug 79 is located at a predetermined position in the communication hole 67, and accordingly, predetermined preloads are axially applied to the meshing portions in the nutation gear mechanism 25.

Further, as shown in FIG. 4 and FIG. 5, through-holes 85 are formed to axially extend through center portions of the preload adjusting plug 79 and the lock nut 80, respectively. The through-holes 85 define hollow shapes (for example, hexagonal shapes) so as to allow a tool (not shown) to engage with the preload adjusting plug 79 and the lock nut 80 from the outside, and to rotate the preload adjusting plug 79 and the lock nut 80.

Next, a preload adjustment operation using the preload applying mechanism 78 in this embodiment will be described. After the nutation gear mechanism 25 is assembled, the bearing 81 is fitted, and the preload adjusting plug 79 is inserted in the through-holes 85, and the male thread portion 83 at the one end of the preload adjusting plug 79 is screwed to the female thread portion 84 at the inner peripheral surface of the Z1 gear 61. Next, the tool is inserted in the hexagonal-shaped through-hole 85 at the inner side of the preload adjusting plug 79, from the output shaft 23-side, so as to rotate the preload adjusting plug 79 with a predetermined fastening torque. Thus, the preload adjusting plug 79 is moved to the predetermined position without being affected by assembly errors or the like, and accordingly, the preloads are applied to the nutation gear mechanism 25. Next, the female thread portion 84 of the lock nut 80 is screwed to the male thread portion 83 of the preload adjusting plug 79, and the tool is inserted into the hexagonal-shaped through-hole 85 of the lock nut 80 from the input shaft 22-side, so as to rotate and fasten the lock nut 80. As a result, the male thread portion 83 and the female thread portion 84 are brought into close contact with each other with a gap therebetween being closed. Thus, the preload adjusting plug 79 is restricted from being loosened.

The operation and effects of the transmission ratio variable device 15 having the configuration as described above will be hereafter described.

With the above-described configuration, the preload adjusting plug 79 is axially inserted through the center portions of the Z1 gear 61, the nutation gear 63 and the Z4 gear 62. One end of the preload adjusting plug 79 is screwed to the inner peripheral surface of the Z1 gear 61 so that the preload adjusting plug 79 is axially movable, the flange portion 82 is provided at the other end of the preload adjusting plug 79 so as to extend radially outward, and the flange portion 82 is engaged with the back face of the Z4 gear 62 through the bearing 81. When the preload adjusting plug 79 is fastened and moved toward the input shaft 22 by rotating the preload adjusting plug 79, both the Z1 gear 61 and the Z4 gear 62 are axially urged and moved toward the nutation gear 63. The preload adjusting plug 79 is axially pressed toward the nutation gear 63 by the lock nut 80 screwed to the male thread portion 83 at one end of the preload adjusting plug 79, and thus, the preload adjusting plug 79 is restricted from being loosened during operation.

Further, the bearing 81 is interposed between the flange portion 82 of the preload adjusting plug 79 and the back face of the Z4 gear 62. The rigidity of the nutaion gear mechanism 25 in a thrust direction can be enhanced by the bearing 81, and thus, it is possible to prevent a situation in which the gears are abnormally meshed with each other in the nutation gear mechanism 25 due to an impact. Further, the preload adjusting plug 79 applies the predetermined preloads to the nutation gear mechanism 25 by the flange portion 82 that directly presses the Z4 gear 62 through the bearing 81.

In the configuration, the preload applying mechanism 78 does not include an elastic member such as a wave washer, and the preload adjusting plug 79 directly presses the Z4 gear 62 so that the predetermined axial preloads are applied to the meshing portions in the nutation gear mechanism 25 in the directions in which the Z1 gear 61 and the Z4 gear 62 approach together. Thus, it is possible to maintain an appropriate meshing state between the gears. Further, since the Z1 gear 61 and the Z4 gear 62 can be coupled to each other by the single preload adjusting plug 79, the number of manufacturing steps can be reduced, and the preloads with the same magnitude can be applied to the meshing portions on opposite sides of the nutation gear mechanism 25 by the fastening torque of the preload adjusting plug 79. As a result, even if any assembly error or the like is present, it is possible to reduce variation in the preloads applied to the meshing portions in the nutation gear mechanism 25 from the opposite sides, and thus, it is possible to obtain stable performance of the nutation gear mechanism 25.

As described above, according to the present invention, it is possible to provide the transmission ratio variable device that makes it possible to reduce the variation in the preloads applied from the opposite sides of the nutation gear mechanism, with the use of a simple configuration.

Although the embodiment according to the present invention has been described, the present invention can be implemented in other forms.

In the above-described embodiment, the preload adjusting plug 79 is screwed to the input shaft 22, and is fastened to urge the Z1 gear 61 so that the preloads are applied to the nutation gear mechanism 25. However, this is not restrictive. The preload adjusting plug 79 may be provided on the output shaft 23 to urge the Z4 gear 62 so that preloads are applied to the nutation gear mechanism 25.

In the above-described embodiment, the present invention is applied to the transmission ratio variable device 15 of the type in which the housing 21 is not rotated by the rotation of the input shaft 22. However, this is not restrictive. The present invention may be applied to a transmission ratio variable device of a type in which a housing is rotated together with an input shaft. Further, the housing 21 may be arranged so as to surround the intermediate shaft 9, or may be arranged in an engine compartment of the vehicle. Further, in the above-described embodiment, the steering wheel 2 may be coupled to the output shaft 23-side, and the intermediate shaft 9 may be coupled to the input shaft 22. That is, the input shaft 22 may be used as an output shaft while the output shaft 23 may be used as an input shaft.

In the above-mentioned embodiment, an outer ring gear in the nutation gear mechanism 25 may couple the Z1 gear 61 and the Z4 gear 62 with each other so that differential rotation is performed, and an inner ring may be coupled with the rotor 42 of the electric motor 24 so as to be rotatable together with the rotor 42.

In the above-described embodiment, cylindrical rollers, needle rollers or tapered rollers may be used as the rolling elements 66. Further, the rolling elements 66 may be arranged in a single row or double rows. The double-row arrangement can prevent the inner ring gear 65 from being inclined. For example, a double-row angular bearing may be used as the bearing with double rows.

In the above-described embodiment, the present invention is applied to the transmission ratio variable device 15 of the nutation gear mechanism type. However, this is not restrictive. The present invention may be applied to a transmission ratio variable device of a wave motion gear type. Further, the transmission ratio variable device is not limited to the transmission ratio variable device of a column-mounted type. The present invention may be applied to a transmission ratio variable device of an intermediate column-mounted type, or a transmission ratio variable device of a pinion gear-integrated type.

In the above-described embodiment, the present invention is applied to the transmission ratio variable device 15 in the vehicle steering system 1. However, the present invention may be applied to other commonly-used devices provided in systems other than the vehicle steering system, in other words, other devices used for other purposes. Further, the vehicle steering system 1 is configured as a rack assist type electric power steering system including the steering assist mechanism that applies the motor assist force to the steering shaft 3. However, this is not restrictive. The vehicle steering system 1 may be an electric power steering system of a column assist type or a pinion assist type. Further, the steering assist mechanism may be eliminated.

What is claimed is:

1. A transmission ratio variable device comprising:
   an input shaft coupled to a steering wheel;
   a housing that supports the input shaft so that the input shaft is rotatable relative to the housing;
   an electric motor having a motor output shaft provided so as to be rotatable relative to the housing;
   a speed reducer that is coupled to the motor output shaft, and outputs a steered angle that is obtained by reducing a motor rotation angle;
   an output shaft that transmits the steered angle output from the speed reducer, to steered wheels; and
   a preload applying mechanism that applies axial preloads to gear meshing portions in the speed reducer,
   wherein the speed reducer includes:
      a first gear that is provided on the input shaft so as to be rotatable together with the input shaft, and includes first teeth formed at an end face of the first gear;
      a fourth gear that is provided on the output shaft so as to be rotatable together with the output shaft, and includes fourth teeth formed at an end face of the fourth gear, the end face of the fourth gear facing the end face of the first gear;
      an inclined shaft provided so as to be inclined with respect to the input shaft and the output shaft; and
      a nutation gear that is provided so as to be inclined with respect to the motor output shaft, and is supported by the inclined shaft so as to be rotatable, the nutation gear including a second gear and a third gear that have second and third teeth, respectively, the second and third teeth being formed at different end faces of the nutation gear so as to mesh with the first and fourth gears, respectively, and the nutation gear rotating according to a difference in the number of teeth between the first gear and the second gear, or a difference in the number of teeth between the fourth gear and the third gear while oscillating in an axial direction of the input shaft, between the first and fourth gears due to rotation of the inclined shaft, and
   wherein the preload applying mechanism includes a preload adjusting plug that is axially inserted through a communication hole extending through center portions of the first gear, the nutation gear and the fourth gear, one end portion of the preload adjusting plug is screwed to an inner peripheral surface of the first gear so that the preload adjusting plug is axially movable, a flange portion is provided at the other end portion of the preload adjusting plug so as to extend radially outward, and the flange portion is engaged with a back face of the fourth gear.

2. The transmission ratio variable device according to claim 1, wherein the preload adjusting plug is axially moved back and forth by rotating the preload adjusting plug, and the preload adjusting plug urges the input shaft in a direction in which the input shaft approaches the output shaft, when the preload adjusting plug is moved toward the input shaft.

3. The transmission ratio variable device according to claim 1, wherein the preload applying mechanism includes a locking nut that is interposed between the first gear and the input shaft, and that is screwed to an outer peripheral surface of the one end portion of the preload adjusting plug so as to press the preload adjusting plug toward the nutation gear.

4. The transmission ratio variable device according to claim 1, wherein the preload applying mechanism includes a bearing that is interposed between the flange portion of the preload adjusting plug and the fourth gear, and that supports the fourth gear so that the fourth gear is rotatable.

* * * * *